Oct. 24, 1967  G. H. STUDTMANN  3,349,315
STATIC INVERTER SYSTEM WITH CURRENT SHARING BY BOTH COMMUTATING
CHOKE WINDINGS DURING COMMUTATING ENERGY RECOVERY
Filed Feb. 11, 1965  2 Sheets—Sheet 2

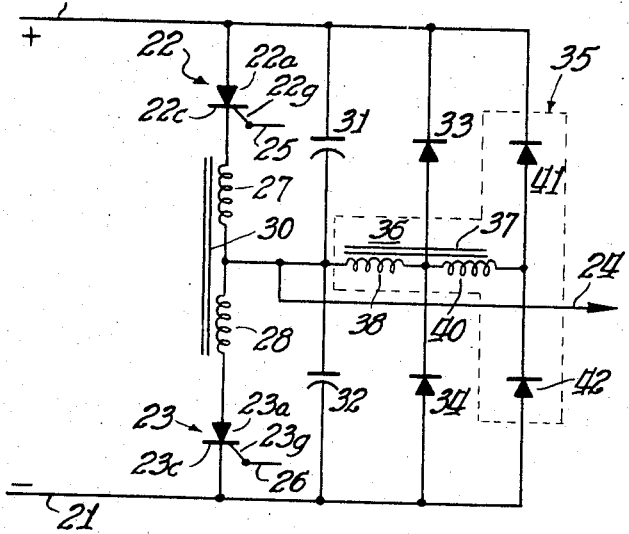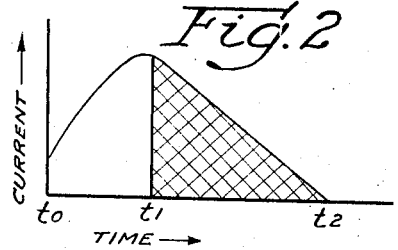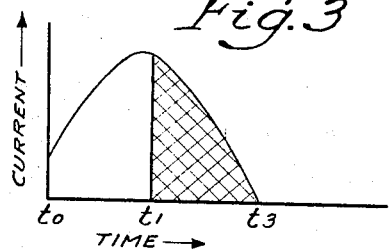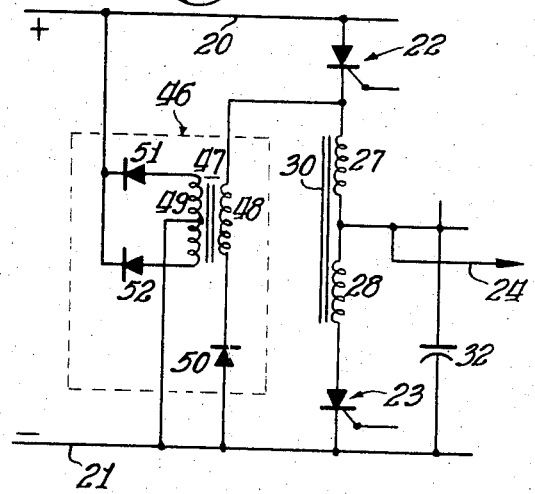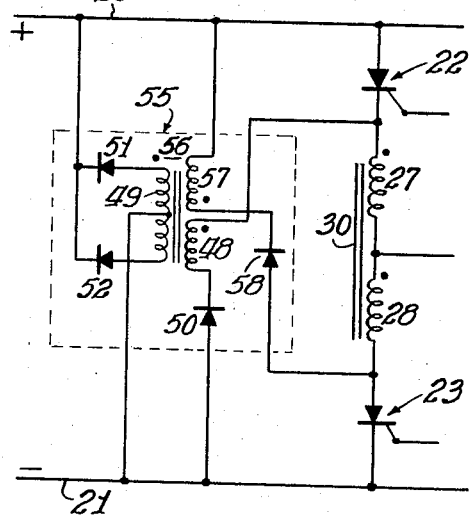

Inventor:
George H. Studtmann
By: James L. Jennings, Jr. Atty.

United States Patent Office 3,349,315
Patented Oct. 24, 1967

3,349,315
STATIC INVERTER SYSTEM WITH CURRENT SHARING BY BOTH COMMUTATING CHOKE WINDINGS DURING COMMUTATING ENERGY RECOVERY
George H. Studtmann, Mount Prospect, Ill., assignor to Borg-Warner Corporation, Chicago, Ill., a corporation of Illinois
Filed Feb. 11, 1965, Ser. No. 431,825
11 Claims. (Cl. 321—45)

ABSTRACT OF THE DISCLOSURE

An inverter has a commutating choke assembly with two windings and including at least one diode connected in the proper sense to complete a D-C current path through both the commutating choke windings only when the polarity reversal occurs as the commutating energy dumped into the commutating choke reaches a maximum value and begins to decrease. A transformer primary winding is coupled in the energy return circuit including the diode and the commutating choke windings, to return the commutating energy through diodes coupled between the secondary winding and the D-C input circuit.

Background of this invention

As the electrical power handling capacity of semiconductor switches such as silicon-controlled rectifiers (SCR's) has increased, such components have been utilized more and more to provide alternating-current (A-C) energy for driving loads such as A-C motors. It is manifestly desirable to obtain the maximum power delivery to the load from the semiconductor switches, to handle the largest possible load or to handle a given load with a semiconductor component of minimum size and expense. The passage of the load current through, and the alternate conduction and non-conduction of, each semiconductor switch causes a heating of the SCR which, if not kept below a given value for the particular SCR, or at least not exceeding this value for more than a very short time duration, can permanently damage the switch.

It is common practice to provide an auxiliary source, such as a capacitor, to supply commutating energy during the commutating interval. This commutating energy may be considered as including a load portion (under load conditions) and a portion which energizes a reactive commutating means, or inductive winding, series-coupled with a first SCR to provide hold-off voltage for a second SCR. This latter portion of the commutating energy, which is "dumped" into the inductive winding, will by itself hereinafter be termed the commutating energy to facilitate this explanation. The time of energy delivery commences as the first SCR is gated on, and the inductive winding is coupled both conductively and magnetically to a second similar winding to form a commutating choke assembly. The second winding in its turn is series-coupled to the second SCR. The transfer of potential between the inductive windings of the choke assembly as the commutating energy is "dumped" into the first inductive winding is utilized in shut-off of the second SCR. Because the second SCR is effectively turned off by this commutating action, there is no conductively coupled path for current flow through the second SCR or the second winding at this time. Thus, during and after the commutating interval, the commutating energy is gradually released from the first winding, recirculating through a circuit including the first SCR and first choke winding to cause heating of the first semiconductor switch considerably in excess of the heating produced by the load current. It is thus apparent that if the level and amount of heating occasioned by return of the commutating energy through the SCR can be minimized, more of the inverter thermal and current-handling rating can be utilized to serve the load requirements, thereby increasing the rating of the inverter.

It is accordingly a primary object of the present invention to provide an inverter of substantially enhanced rating by minimizing the effect on the semiconductor switches of the return of commutating energy after the associated switch has been turned off.

It is a more specific object of the present invention to achieve the enhanced rating of an inverter circuit by utilizing portions of the circuit otherwise dormant during the commutating interval to return the commutating energy to the input circuit.

Summary of this invention

In a preferred embodiment the present invention is useful in connection with an inverter system which includes semiconductor switching means operable to convert D-C energy into A-C energy, and an input circuit to pass D-C energy to the switching means. A commutating choke assembly includes a first inductive winding which is conductively coupled to the semiconductor switching means and the commutating choke also includes a second inductive winding which is magnetically coupled to the first winding, and means is provided for passing commutating energy into the first inductive winding as the semiconductor switching means is turned on, thus storing energy in the commutating choke assembly. In accordance with the present invention, an energy return circuit is provided and it includes the second inductive winding of the commutating choke assembly. The invention also comprises unidirectional current conduction means connected to establish an auxiliary current conductive path for current flow through both the first and second inductive windings of the commutating choke assembly. The auxiliary D-C current conductive path is completed only in response to the polarity reversal which occurs as the amount of energy stored in the commutating choke assembly reaches a maximum value and begins to diminish. Circuit means, including the auxiliary conductive path, returns the commutating energy stored in the commutating choke assembly to the D-C input circuit of the system.

The invention finds particular utility in an inverter arrangement in which a pair of semiconductor switching means are intercoupled with respective associated windings of the commutating choke assembly, which windings are coupled to each other both conductively and magnetically. As one of the semiconductors is gated on, commutating energy is rapidly passed into its associated commutating winding. In accordance with the inventive teaching, an auxiliary conductive circuit is completed upon commencement of return of the commutating energy, so that the other winding of the commutating choke, the winding associated with the switching means just being turned off, shares the current flow attributable to return of the commutating energy. As will be seen the level of the current passing through the switching means just gated on, by reason of return of the commutating energy, is substantially reduced with the inclusion of the other commutating winding in the auxiliary conductive path.

To enable those skilled in the art to make and use the invention, a description thereof will be set forth in connection with the accompanying drawings, in the several figures of which like reference numerals identify like elements, and in which:

FIGURE 1 is a schematic diagram, depicting one known form of inverter arrangement;

FIGURES 2 and 3 are graphical illustrations useful in understanding the operation of known inverter circuits;

FIGURE 4 is a partial schematic diagram, indicating one form of the present invention and its connection in an inverter circuit;

FIGURE 5 is a graphical illustration useful in understanding the operation of the embodiment shown in FIGURE 4;

FIGURE 6 depicts another embodiment of the present invention, related to that of FIGURE 4;

General inverter operation

Figure 7:
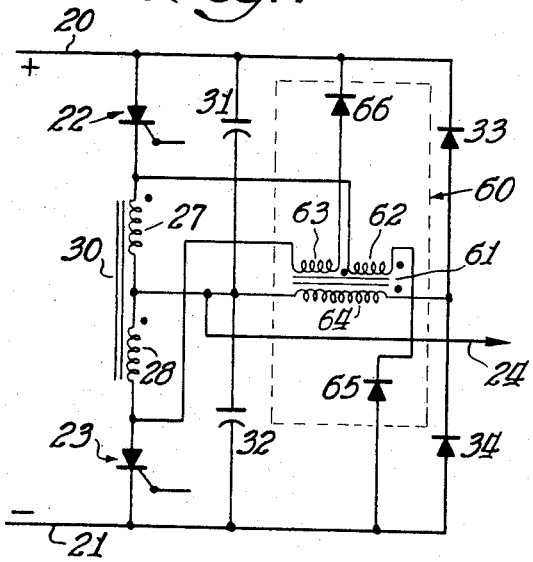
FIGURE 7 is a schematic diagram of a preferred embodiment of the present invention.

The circuit depicted in FIGURE 1 may comprise one phase of a three-phase inverter, or it may be a simple inverter for use to provide single-phase energy. Any suitable battery or other D-C energy source (not shown) can be utilized to pass D-C energy over an input circuit comprising conductors 20 and 21, with the alternate conduction of the semiconductor switching means 22 and 23 being effective to provide A-C output energy over an output circuit including conductor 24 to any suitable load (not shown). Each of the semiconductor switches is depicted as a silicon-controlled rectifier, with an anode referenced by $a$, a cathode indicated by $c$, and a gate or input element denoted by $g$. Either the respective gates 22$g$ and 23$g$, or the conductors coupled to these gates and referenced by numerals 25 and 26 respectively, may be considered as means for initiating operation of these semiconductor switches between their non-conducting and conducting states. Such operation is well known and understood by those skilled in the art and the conventional logic or control circuit requires no further description here. A commutating choke assembly is shown comprising two separate commutating windings, or reactive commutating means, 27 and 28. These windings are conductively coupled in series between cathode 22$c$ of semiconductor switch 22 in the upper sub-circuit of the inverter and anode 23$a$ of SCR 23 in the lower sub-circuit of the inverter arrangement. "Conductive coupling" or a "conductive path" between any pair of points in an electrical circuit as used herein and in the appended claims, refers to a path between such points which could pass direct current responsive to application of a D-C potential difference between that pair of points. A common core 30 is provided to magnetically couple windings 27 and 28 with each other. Other conventional components include a first commutating capacitor 31, coupled between conductor 20 and the common connection of windings 27 and 28, and a second commutating capacitor 32 coupled between conductor 21 and the same common connection. It is emphasized that these commutating capacitors are not the "reactive commutating means" referred to in the claims, in that these capacitors only provide a storage arrangement or energy source for rapidly passing energy to the load and into the associated winding (27 or 28) as one of the SCR's is gated on. Other means of supplying this energy, as by suitable and selective intercoupling with the appropriate polarity of an auxiliary power supply, could be utilized, but inasmuch as capacitors are conventionally used, they will be indicated and described in their conventional arrangement. Other conventional components include the "spillover" or energy return diodes 33 and 34. Diode 33 is coupled between conductor 20 and the common connection of windings 38 and 40, and diode 34 is coupled between conductor 21 and the same connection. Because the load supplied over output conductor 24 is frequently an inductive reactance, such as a motor, the tendency of such a load is to attempt to maintain flow of the load current in the same direction for a brief time after one or the other of the SCR's is gated off. Accordingly the spillover diodes 33 and 34 provide an auxiliary path for such brief current flow shortly after one SCR is turned off and the other is gated on.

In FIGURE 1 an energy return arrangement 35 is indicated, and this arrangement represents a significant advance in the static inverter art. As shown, the circuit comprises a transformer arrangement 36 including a core 37, primary winding 38 having one end coupled between the common connection of windings 27, 28 and capacitors 31, 32 and the other end coupled to the common connection of diodes 33, 34. Transformer 36 has a secondary winding 40, one end of which is coupled between the common connection of spillover diodes 33, 34 and the other end of which is coupled to the common connection between energy return diodes 41 and 42, in turn respectively coupled to conductors 20 and 21. In practice transformer 36 is preferably an autotransformer as shown to obtain maximum economy and minimum physical size of this component, although other transformer arrangements are also workable.

Assuming initially that circuit 35 is not in the inverter arrangement and that therefore a short circuit or direct current path of zero resistance is provided between the common connection of capacitors 31 and 32 and the common connection of diodes 33 and 34, operation of the inverter will be considered with SCR 22 initially in the on or conducting condition. At this time current is flowing from conductor 20 through SCR 22, winding 27 of the commutating choke, and over conductor 24 to the load. Under these conditions with a virtual short circuit across capacitor 31, there is no charge accumulated in this capacitor. However, substantially all of the battery or input D-C voltage which appears on conductors 20 and 21 and is at this time applied between conductors 24 and 21. Accordingly, capacitor 32 is charged to approximately the potential which appears on conductors 20 and 21.

It is now assumed that a suitable control or gating pulse is applied over conductor 26 to gate 23$g$ of SCR 23. Accordingly SCR 23 is immediately rendered conductive to provide a conductive path for current flow from the load back through conductor 24, over winding 28 and SCR 23 to conductor 21. Thus capacitor 32 immediately begins to discharge through winding 28 and SCR 23. At the first instant the current flowing in winding 28 is essentially equal to the current which was flowing in winding 27 just prior to commutation, and which was magnetically transferred to winding 28. This initial current in reactive commutating means 28 is substantially increased by the discharge of capacitor 32 as it passes the commutating energy into winding 28, to provide a rapidly increasing current as indicated between times $t0$ and $t1$ in FIGURE 2. By virtue of the magnetic coupling between windings 28 and 27, the potential appearing across winding 28 is approximately doubled, to provide a potential at cathode 22$c$ of the proper amplitude and polarity to shut off SCR 22 and hold it off for a time duration longer than that required for this SCR to recover or return to the blocking condition. It is noted that this conventional usage of the windings 27 and 28 for commutation, after the transfer of current from winding 27 to winding 28 as SCR 22 is shut off, does not provide any current flow through winding 27 during the commutating interval, but current is only flowing through the conductive coupling path including winding 28 of the choke assembly down to conductor 21.

Referring again to FIGURE 2, at time $t1$ all the commutating energy from capacitor 32 (or any suitable supply) has been stored within inductor 28, and the level of the current flow through this inductor has just begun to decrease. In most previous inverter systems, the commutating energy was dissipated by continuous recirculation around the path including winding 28, SCR 23, and spillover diode 34. The principal dissipation was in the form of heat of the semiconductor elements 23 and 34. To the extent that there is a limitation on the thermal rating of SCR 23, and that an appreciable part of this rating accommodates the heating caused by the return of the commutating energy rather than accommodating heating only due to the load current, this conventional return of the commutating energy is wasteful and inefficient, resulting in higher cost and larger physical size per k.v.a. of the inverter. The heating caused by return of the commutating energy by recirculation through the semiconductor components is represented by the cross-hatched area between times $t1$ and $t2$ in FIGURE 2. Accordingly to the extent that the cross-hatched area can be reduced, the heating of the semiconductors by the conventional return of the commutating energy is correspondingly reduced to provide a related increase in the rating of the inverter.

One significant improvement in the reduction of heating during return of the commutating energy is shown by the circuit 35. With primary winding 38 interposed in the path for the recirculation of commutating energy, transformer 36 is designed so that energy is effectively returned over this transformer and through either diodes 34, 41 or 33, 42 to the input circuit as the recirculation occurs, significantly reducing the time required for the energy return. Not only the time required, but also the amount of heating of the semiconductor components 23 and 34 (and 22 and 33, when SCR 22 is gated on) as depicted by the cross-hatched area between times $t1$ and $t3$ in FIGURE 3, is significantly reduced by this energy return arrangement. However, the high level of current flow through winding 28 at time $t1$ and immediately thereafter is still present, and there is still latitude for improvement of the energy return system.

The present invention: structure

In accordance with the present invention, a novel energy return circuit is provided to establish an auxiliary path for conductive current flow through winding 28 during the time in which commutating energy is returned from this winding. In the auxiliary conductive path, an additional inductive means or winding is conductively coupled in series with the turns of winding 28, and this additional inductive means is magnetically coupled to winding 28. The additional inductive means provided in the auxiliary conductive path may comprise the other winding portion 27 of the commutating winding assembly 27, 28, in that these windings are magnetically coupled over a core 30. In conventional inverter arrangements winding 27 does not pass any current during the commutating interval after SCR 22 is turned off, but only receives the induced voltage from winding 28 in the previously described action to assist in shutoff of SCR 22. It is noted that the energy return circuit is also coupled to the input circuit 20, 21 to return the commutating energy from winding 28 to the input circuit with a minimum of recirculation through the path including SCR 23 and diode 34.

This periodic or cyclical return of the commutating energy (first from one winding of the choke assembly, then from the other, and so on) through the auxiliary conductive path will be explained in connection with FIGURE 4, which shows within energy return circuit 46 a transformer 47 having a primary winding 48 and a center-tapped secondary winding 49, a first diode or unidirectional current conducting means 50, and another pair of diodes 51 and 52. An auxiliary conductive current path to return the commutating energy extends from inductive winding 28 over SCR 23, a conductor 21, diode 50, primary winding 48 of transformer 47, and through winding 27 back to winding 28. The center-tapped connection of the secondary winding is coupled to input conductor 21, and the ends of secondary winding 49 are coupled through diodes 51 and 52 to the other input conductor 20.

The present invention: operation

The amount of energy stored in the magnetic circuit including winding 28 just prior to reversal of the polarity across this winding as the commutating energy is returned, is related to $N\phi I$, where N is the number of turns in winding 28, $\phi$ is the maximum level of flux produced as all of the commutating energy is passed into winding 28, and I denotes the peak current flowing through winding 28 at this time. Windings 27 and 28 are magnetically intercoupled so that this energy is in effect stored in the choke assembly 27, 28 although current is flowing only through winding 28. After the voltage across winding 28 reverses and as soon as the return of the commutating energy commences (time $t1$ in FIGURE 5), current begins to flow from winding 28 through SCR 23 and over the auxiliary conductive path including diode 50, winding 48, and through the other winding 27 of the commutating choke assembly back to winding 28. Thus in effect N, the number of turns, has been doubled by adding the turns of winding 27 in series with the turns of winding 28, while the flux level $\phi$ has remained constant. In that the amount of stored energy just prior to polarity reversal and just after must be the same, the level of the current I flowing through winding 28 and SCR 23 immediately decreases to one-half its original value (under no load conditions). This sudden and substantial drop in the level of the commutating current is indicated in FIGURE 5, and the heating of SCR 23 caused by the return of the commutating energy is thus drastically reduced. This returned commutating energy is passed over transformer 47, rectified in one of diodes 51 and 52 and returned to the input circuit by reason of the connections to conductors 20, 21. Accordingly not only is the heating of SCR 23 significantly reduced, but the energy used in the commutation process is recovered for subsequent use in the cyclical charging of capacitors 31, 32 and their subsequent discharge during each cycle of operation of the inverter.

FIGURE 6 shows another embodiment of the invention which differs from that of FIGURE 4 by the inclusion in the energy return circuit 55 of a transformer 56 including one additional primary winding 57. A diode 58 is coupled between the lower portion of winding 57 and the common connection between SCR 23 and winding 28, and the upper portion of winding 57 is coupled to input conductor 20. Accordingly an auxiliary conductive path is completed during each half cycle of inverter operation. That is, when SCR 23 is turned off, as SCR 22 is gated on, an auxiliary current conductive path extends from winding 27 through winding 28 of the choke assembly, over diode 58, primary winding 57, conductor 20, and SCR 22 back to winding 27. The operation of this circuit during alternate half cycles is readily apparent from the previous explanation given in connection with FIGURE 4.

Preferred embodiment

An embodiment presently considered suitable for commercial use is depicted in FIGURE 7. Energy return circuit 60 comprises a transformer 61 having a pair of primary windings 62 and 63, and a secondary winding 64. One end of secondary winding 64 is coupled to the common connection between capacitors 31, 32 and windings 27, 28, and the other end of the secondary winding is shown connected between diodes 33 and 34. One end of primary winding 62 is coupled over a diode 65 to conductor 21 and the other end of primary winding 62 is coupled to the common connection between winding 27 and SCR 22. The other primary winding 63 has one end coupled through a diode 66 to conductor 20, and the other end of winding 63 is coupled to the common connection between winding 28 and SCR 23.

In operation, as SCR 22 is switched off and SCR 23 is gated on, the commutating energy stored in capacitor 32 is rapidly passed into winding 28 of the choke assembly 27, 28. After reversal of the polarity across winding 28 and the commencement of the return of commutating energy to the circuit, an auxiliary conductive path is completed from winding 28 over SCR 23, conductor 21, diode 65, primary winding 62, and winding 27 back to winding 28 of the choke assembly. Accordingly a conductive path is completed, including winding 27 and winding 28, such that winding 27 shares the current which returns the energy stored in the magnetic circuit of the choke assembly to the input circuit. A considerable portion of the energy transferred around the just-described auxiliary circuit is passed by magnetic coupling over secondary winding 64 of transformer 61 and back over one of diodes 33 and 34 then in the effective circuit (at this moment it is diode 33) to the input circuit. There is also a conductive current path for energy return, as will be explained in connection with FIGURE 8. The alternate operation of this arrangement will be readily apparent to those skilled in the art from the previous descriptions and the showing of transformer arrangement 38, 40 in FIGURE 1. It is also evident that diodes 65 and 66 provide for the return of reactive energy in a manner similar to the spillover diodes in earlier circuits.

Figure 8:
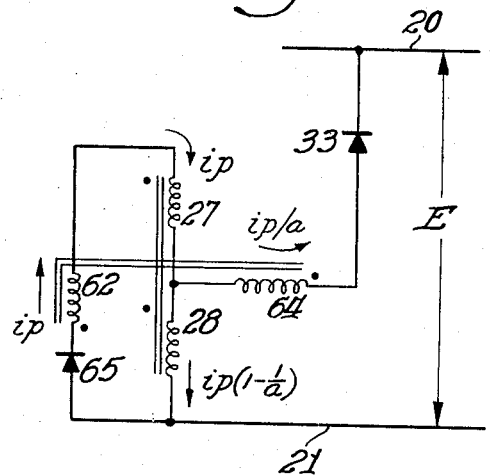
FIGURE 8 is an equivalent circuit diagram useful in understanding the operation of the circuit depicted in FIGURE 7.

FIGURE 8 shows an equivalent circuit of part of the inverter circuit depicted in FIGURE 7, neglecting the relatively small voltage drop across SCR 23 as the commutating energy stored in winding 28 of the choke assembly begins its return to the circuit. Because of the sense in which it is coupled in the circuit, diode 65 may be considered as means for completing a conductive current path which includes not only the winding 28 to which the commutating energy has been delivered (by discharge of the associated capacitor or otherwise), but also an additional inductance (the other winding 27 in this embodiment) for sharing the current just after commencement of return of the commutating energy by effectively contributing to the total number of turns in the spillover current circuit. It is apparent that an inductive winding other than winding 27 could be coupled from the left side of winding 62 directly to the common junction between windings 28 and 27, and the upper winding 27 of the choke assembly would not then be utilized in the return of the commutating energy. However a significant part of the inventive contribution is the utilization of the upper portion 27 of the total choke assembly during the time in which the "spillover" or commutating energy is returned, whereas previously there was no current flow through this winding (27) after SCR 22 was turned off.

After the commutating energy has been transferred into winding 27. Assuming a turns ratio $a$ between primary 28 begins to decrease and the polarity of the potential appearing across this winding reverses. A current $i_p$ begins to flow through diode 65, primary winding 62 and choke winding 27. Assuming a turns ratio $a$ between primary winding 62 and a secondary winding 64, a current $I_p/a$ flows through secondary winding 64 and diode 33 to conductor 20. This leaves a current of $i_p$ $(1-1/a)$ flowing (under no load conditions) in winding 28. With any practical turns ratio (and under no load conditions) the currents in windings 28 and 27 divide approximately equally, with slightly less current flowing in winding 28 than in winding 27.

*Other embodiments*

Figure 9:
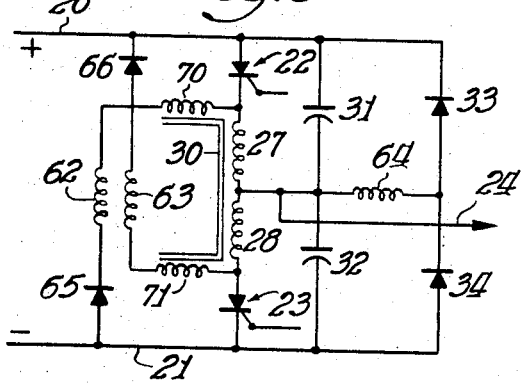
FIGURES 9–11 are schematic diagrams depicting other embodiments of the invention.

In the circuit of FIGURE 9, two additional windings 70 and 71 are provided on the same core 30 which magnetically intercouples windings 27 and 28. In addition, windings 62, 63 and 64 of transformer 61, shown in close proximity in FIGURE 7, are depicted differently but their electrical and magnetic functions are exactly the same. Accordingly for a given return of the commutating energy, for example from winding 28, a conductive path is completed from the lower portion of winding 28 over SCR 23, conductor 21, diode 65, primary winding 62 of the return transformer, and windings 70 and 27 to winding 28. It is immediately apparent that with the inclusion of more turns in the current conductive path through which the commutating energy is returned, with the amount of energy present just before and just after this energy return commences being constant, the recirculating current may be reduced at no load significantly below the level achieved in the embodiment of FIGURE 7, that is, substantially below the point at which the ramp or gradual current decrease is shown in FIGURE 5. The voltage rating of protective diodes 65 and 66 must be increased, but the increased voltage rating is offset by the concomitant decrease of current flow through these diodes, so that the cost of these components is maintained approximately constant.

Figure 10:
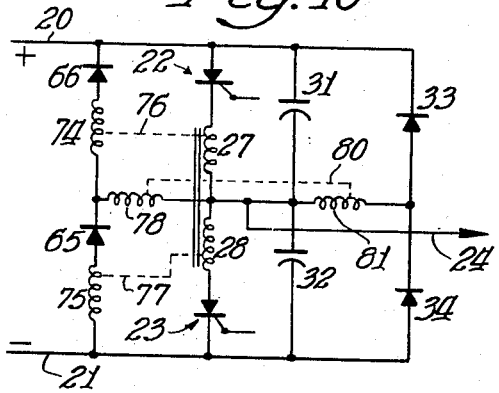

Another configuration for the energy return circuit is shown in FIGURE 10. Coupled between conductors 21 and 20 is a third inductance 75, a third diode 65, a fourth inductance 74, and a fourth diode 66. Rather than extend the showing of the core which magnetically couples windings 27 and 28, windings 74 and 75 are shown coupled in the same magnetic circuit of the choke assembly by the broken lines 76 and 77. All four windings 27, 28, 74 and 75 can be wound on the same magnetic core to effect this intercoupling. To the common junction between diode 65 and winding 74, one end of the primary winding 78 of the energy return transformer is coupled. Broken line 80 indicates the magnetic coupling between primary winding 78 and secondary winding 81 of the transformer. The other end of primary winding 78, and one end of secondary winding 81, are coupled to the common connection of windings 27 and 28. Thus, at the commencement of return of the commutating energy from winding 28, a current conductive path is completed from this winding through SCR 23, conductor 21, winding 75, diode 65, and primary winding 78 to the top of winding 28. This is another circuit for providing additional turns in the current conductive path just after return of the commutating energy commences, thereby to further reduce the level of the recirculating current occasioned by the return of the commutating energy.

Figure 11:
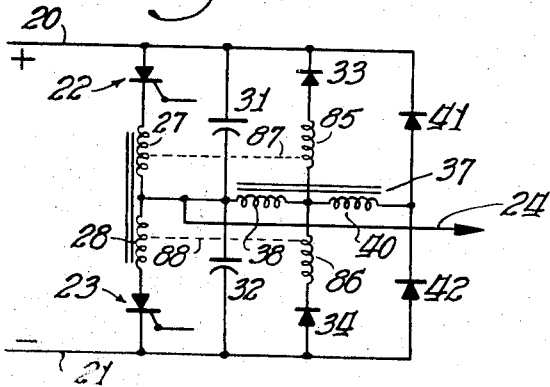

The circuit shown in FIGURE 11 depicts the manner in which the desired energy return arrangement can be provided by adding windings 85 and 86, electrically coupled with each other between diodes 33 and 34. In addition, these windings are magnetically coupled as represented by the broken lines 87 and 88 to the commutating choke assembly windings 27, 28. Thus, when SCR 23 is gated on, an auxiliary conductive path is provided from the lower portion of winding 28 over SCR 23, conductor 21, diode 34, winding 86 (which in this embodiment is the second inductive winding for sharing the current in the return path for the commutating energy), primary winding 38, to winding 28. The return of the recirculating energy over secondary winding 40 and diodes 41, 42 has already been explained. It is noted that the embodiments shown in FIGURES 10 and 11 provide separate inductances, other than the portion of the commutating choke over which the shut-off voltage is being applied, to increase the number of turns in the conductive path for the return energy and thereby decrease the amplitude of the current through the SCR which is attributable to the return of the commutating energy.

From the foregoing it is evident that a substantial increase in the rating or power handling capacity of an inverter having components of given electrical and physical size can be accomplished by practice of this present invention. By immediately increasing the number of turns in the current conductive path for returning the commutating energy, the level of the return current is reduced by an amount related to the number of turns added in the return current path. Of substantial importance is the embodiment in which these additional turns are obtained "free" by utilizing the other portion of the commutating choke assembly in the direct current path, whereas no current normally passes through this other portion of the choke when the other portion of the choke is in the load circuit. The energy return transformer (for example, transformer 61 in FIGURE 7) need not be a physically large unit, because the volt-time integral, or the combination of the voltage level that is passed over this transformer and the time period during which this energy transfer occurs, is comparatively small, being just large enough to allow retrieval of the commutating energy.

While only particular embodiments of the invention have been described and illustrated, it is apparent that modifications and alterations may be made therein. It is therefore the intention in the appended claims to cover all such modifications and alterations as may fall within the true spirit and scope of the invention.

What is claimed is:

1. In an inverter circuit having a D-C input arrangement, semiconductor switching means, a commutating choke assembly including a first inductive winding conductively coupled to said semiconductor switching means and a second inductive winding magnetically coupled to said first winding, and means for passing commutating energy into said first inductive winding and thus storing energy in said commutating choke assembly as said semiconductor switching means is turned on, the improvement which comprises:

an energy return circuit, including said second inductive winding, unidirectional current conduction means connected in said energy return circuit in the proper sense to complete an auxiliary current conductive path which conductively couples said first inductive winding and said second inductive winding to pass D-C current in series through both said windings only in response to the polarity reversal which occurs as the amount of energy stored in the commutating choke assembly reaches a maximum value and begins to diminish, and circuit means including the auxiliary current conductive path for returning the commutating energy stored in the commutating choke assembly to the D-C input arrangement.

2. In an inverter circuit having an input circuit including a pair of D-C input conductors, first and second semiconductor switches, respectively coupled to different ones of said input conductors, first and second inductances conductively coupled in series between said semiconductor switches and magnetically coupled to each other, and means for passing commutating energy into one of said inductances and thus storing energy therein as the one of the semiconductor switches coupled to said one inductance is turned on, the improvement which comprises:

an energy return circuit, including the other of said inductances, unidirectional current conducting means for completing an auxiliary current conductive path for current flow through said first and second inductances as the amount of energy stored in the first inductance reaches a maximum value and begins to diminish, and circuit means, including a transformer coupled in the auxiliary current conductive path, and unidirectional current conducting means coupled to the transformer and to at least one of said input conductors, for returning the commutating energy stored in the first inductance to the input circuit.

3. In an inverter circuit having a D-C input arrangement, a semiconductor switch, a commutating choke assembly including a first inductive winding conductively coupled to said semiconductor switch and a second inductive winding magnetically coupled to said first inductive winding, and means for passing commutating energy into said first inductive winding and thus storing energy in the commutating choke assembly as said semiconductor switch is gated on, the improvement which comprises:

an energy return circuit including said second inductive winding, a diode connected in said energy return circuit in the proper sense to complete an auxiliary path which conductively couples said first and second inductive windings to pass D-C current in series through both said first and second inductive windings only in response to the polarity reversal which occurs as the amount of energy stored in the commutating choke assembly reaches a maximum value and begins to diminish, a transformer having a primary winding coupled in the auxiliary conductive path and having a secondary winding, and means including at least one other diode coupled between said secondary winding and the D-C input arrangement for returning the commutating energy stored in the first inductance to the D-C input arrangement.

4. In an inverter circuit having a pair of D-C input conductors, first and second semiconductor switches respectively coupled to different ones of said conductors, first and second inductances conductively coupled in series between said semiconductor switches and magnetically coupled to each other, means for passing commutating energy into one of said inductances and thus storing energy in the assembly including the first and second magnetically coupled inductances as the one of said semiconductor switches coupled to said one inductance is gated on, the improvement which comprises:

an energy return circuit, including a transformer having a pair of primary windings and a secondary winding, a first diode for completing a first current conductive auxiliary path through one of said primary windings and through both of said first and second inductances as the amount of energy stored in the first inductance reaches a maximum value and begins to diminish, a second diode for completing a second current conductive auxiliary path through the other of said primary windings and through both of said first and second inductances as the amount of energy stored in the second inductance reaches a maximum value and begins to diminish, and means including at least one rectifier coupled between said secondary winding and one of said D-C input conductors for returning the commutating energy stored in the inductances to the D-C input conductors.

5. An inverter circuit as claimed in claim 4 in which said secondary winding has a center-tapped connection coupled to one of said input conductors, and the extremities of said secondary winding are respectively coupled through diodes to the other of said input conductors.

6. In an inverter circuit having a D-C input circuit, a semiconductor switch coupled to said input circuit, a first inductance coupled to said semiconductor switch, and means for passing commutating energy into said inductance and thus storing energy therein as said semiconductor switch is gated on, the improvement which comprises:

an energy return circuit, including a second inductance conductively coupled to said first inductance, means for magnetically coupling said first inductance with said second inductance, a transformer having primary and secondary windings, means for completing an auxiliary current conductive path through said primary winding and through both of said first and second inductances as the amount of energy stored in the first inductance reaches a maximum value and begins to diminish, a pair of diodes coupled with each other at a common connection point and coupled to said D-C input circuit, means for coupling one end of said secondary winding to the common coupling point between said first and second inductances, and means for coupling the other end of said secondary winding to the common connection point between said pair of diodes, to provide a circuit for returning the commutating energy stored in the first inductance to the D-C input circuit.

7. In an inverter circuit having a pair of D-C input conductors, first and second semiconductor switches respectively coupled to different ones of said conductors, first and second inductances coupled electrically in series between said semiconductor switches and magnetically coupled to each other, and means for passing commutating energy into one of said inductances and thus storing energy therein as the one of said semiconductor switches coupled to said one inductance is gated on, the improvement which comprises:

an energy return circuit, including a transformer having a pair of primary windings and a secondary winding, a first diode for completing a first auxiliary conductive path for current flow through one of said primary windings and through both of said first and second inductances as the amount of energy stored in the first inductance reaches a maximum value and begins to diminish, a second diode for completing a second auxiliary conductive path for current flow through the other of said primary windings and through both of said first and second inductances as the amount of energy stored in the second inductance reaches a maximum value and begins to diminish, third and fourth diodes coupled to each other at a common connection point and coupled between said D-C input conductors, means for coupling one end of said secondary winding to the common connection of said first and second inductances, and means for coupling the other end of said secondary winding to the common connection point between said third and fourth diodes, to provide a circuit for returning the commutating energy stored in the inductances to the D-C input conductors.

8. In an inverter circuit having a pair of D-C input conductors, first and second SCR's each having anode, cathode, and gate elements, means for coupling the cathode of the first SCR to one of said input conductors, means for coupling the anode of the second SCR to the other of said input conductors, a choke assembly having first and second windings conductively coupled in series between the anode of said first SCR and the cathode of said second SCR, means for magnetically coupling said windings with each other, means for applying control signals to the gates of the SCR's, and capacitor means for passing commutating energy into the windings of said choke assembly and thus storing energy therein as the semiconductor switches are alternately gated on, the improvement which comprises:

an energy return circuit, including a transformer having a pair of primary windings and a secondary winding, a first diode for completing a first auxiliary conductive path for current flow through one of said primary windings and through both of said first and second windings of the choke assembly as the amount of energy stored in the first choke winding reaches a maximum value and begins to diminish, a second diode for completing a second auxiliary conductive path for current flow through the other of said primary windings and through both of said first and second windings of the choke assembly as the amount of energy stored in the second choke winding reaches a maximum value and begins to diminish, third and fourth diodes coupled to each other and coupled between said D-C input conductors, means for coupling one end of said secondary winding to the common connection of said first and second choke windings, and means for coupling the other end of said secondary winding to the common connection between said third and fourth diodes, to provide a circuit for returning the commutating energy stored in the choke windings to the D-C input conductors.

9. In an inverter circuit having a pair of D-C input conductors, first and second semiconductor switches respectively coupled to different ones of said conductors, first and second inductances conductively coupled in series between said semiconductor switches, and means for passing commutating energy into one of said inductances and thus storing energy therein as the one of said semiconductor switches coupled to said one inductance is gated on, the improvement which comprises:

an energy return circuit, including a transformer having a pair of primary windings and a secondary winding, a first diode and a third inductance for completing a first auxiliary conductive path for current flow through one of said primary windings and through both of said first and second inductances as the amount of energy stored in the first inductance reaches a maximum value and begins to diminish, a second diode and a fourth inductance for completing a second auxiliary conductive path for current flow through the other of said primary windings and through both of said first and second inductances as the amount of energy stored in the second inductance reaches a maximum value and begins to diminish, means for magnetically coupling said third and fourth inductances with said first and second inductances, third and fourth diodes coupled to each other and coupled between said D-C input conductors, means for coupling one end of said secondary winding to the common connection of said first and second inductances, and means for coupling the other end of said secondary winding to the common connection between said third and fourth diodes, thus to provide a circuit for returning the commutating energy stored in the first and second inductances to the D-C input conductors.

10. In an inverter circuit having a pair of D-C input conductors, first and second semiconductor switches respectively coupled to different ones of said conductors, first and second inductances conductively coupled in series between said semiconductor switches, and means for passing commutating energy into one of said inductances and thus storing energy therein as the one of said semiconductor switches coupled to said one inductance is gated on, the improvement which comprises:

an energy return circuit, including a transformer having a primary winding and a secondary winding, means for coupling one end of said primary winding and one end of said secondary winding to the common connection between said first and second inductances, a first diode and a third inductance coupled in series between one of said input conductors and the other end of said primary winding for completing an auxiliary conductive path for current flow through said primary winding and through both of said first and third inductances as the amount of energy stored in the first inductance reaches a maximum value and begins to diminish, a second diode and a fourth inductance coupled in series between the other of said input conductors and said other end of the primary winding for completing an auxiliary conductive path for current flow through said primary winding and through both of said second and fourth inductances as the amount of energy stored in the second inductance reaches a maximum value and begins to diminish, means for magnetically coupling said third and fourth inductances with said first and second inductances, third and fourth diodes coupled to each other and coupled to said D-C input conductors, and means for coupling the other end of said secondary winding to the common connection between said third and fourth diodes, thus to provide a circuit for returning the commutating energy stored in the first and second inductances to the D-C input conductors.

11. For use with an inverter circuit which comprises a first input conductor, an SCR having anode, cathode and gate elements, means for coupling the anode of said SCR to said input conductor, a commutating choke assembly comprising first and second windings electrically coupled in series with each other, means for coupling one end of said first winding to the cathode of said SCR, a second SCR having anode, cathode and gate elements, means for coupling one end of said second winding to the anode of said second SCR, a second input conductor, means for coupling said second input conductor to the cathode of said second SCR, means for applying gating signals to the gate elements of said first and second SCR's, a load conductor coupled to the common connection between said first and second windings to pass A-C energy responsive to the alternate conduction of said SCR's, a first commutating capacitor coupled between said one input conductor and the common connection of said first and second windings, a second commutating capacitor coupled between said other input conductor and the common connection of said first and second windings, a pair of spill-over diodes coupled to each other and coupled between said input conductors, an energy return transformer having a primary winding and a secondary winding, means for coupling one end of said primary winding to the common connection between said first and second choke windings and for coupling the other end of said primary winding to the common connection between said spill-over diodes, a pair of energy return diodes coupled to each other and coupled between said input conductors, means for coupling said secondary winding of the energy return transformer between said common connection of the spill-over diodes and the common connection of the energy return diodes, the improvement which comprises:

a first auxiliary winding, conductively coupled between one of said spill-over diodes and the common connection between the primary and secondary windings of the energy return transformer, and a second auxiliary winding, conductively coupled between the other spill-over diode and said common connection of the primary and secondary windings of said energy return transformer, means for magnetically coupling said first and second auxiliary windings with said first and second windings of the commutating choke assembly, whereby the spill-over diodes are effective to complete separate auxiliary D-C paths including the first and second auxiliary windings to effectively return the commutating energy from the windings of the choke assembly to the input conductors with a minimum heating of the SCR's.

References Cited

UNITED STATES PATENTS

| | | | |
|---|---|---|---|
| 3,131,343 | 4/1964 | Reinert | 321—16 |
| 3,250,978 | 5/1966 | Moscardi. | |
| 3,263,152 | 7/1966 | Walker | 321—45 |
| 3,286,155 | 11/1966 | Corey | 321—45 |
| 3,303,406 | 2/1967 | Bedford | 231—44 |
| 3,308,371 | 3/1967 | Studtmann | 321—45 |
| 3,311,809 | 3/1967 | Corey et al. | 321—45 |

JOHN F. COUCH, *Primary Examiner.*

W. M. SHOOP, Jr., *Assistant Examiner.*